United States Patent [19]

Urabe et al.

[11] Patent Number: 5,715,056
[45] Date of Patent: Feb. 3, 1998

[54] FOURIER TRANSFORM SPECTROMETER HAVING HIGH AND LOW GAIN CHANNELS

[75] Inventors: Shuji Urabe; Takeo Tanaami, both of Tokyo, Japan

[73] Assignee: Yokogawa Electric Corporation, Tokyo, Japan

[21] Appl. No.: 667,205

[22] Filed: Jun. 20, 1996

[30] Foreign Application Priority Data

Jun. 21, 1995 [JP] Japan ................................. 7-154181

[51] Int. Cl.⁶ ................................................ G01B 9/02
[52] U.S. Cl. ............................................... 356/346
[58] Field of Search ........................... 256/346; 364/576

[56] References Cited

U.S. PATENT DOCUMENTS 4,792,230  12/1988  Naganuma et al. ............... 356/346
5,110,211  5/1992  Niki et al. ........................... 356/346

Primary Examiner—Samuel A. Turner
Attorney, Agent, or Firm—Moonray Kojima

[57] ABSTRACT

A high S/N Fourier transform spectrometer with low A/D converter noise, comprising a light receiving device; a low gain channel and a high gain channel which convert to and retain as digital signals the output from the light receiving device; and a computation control unit which determines a correlation equation between the low gain and high gain channels and substitutes the low gain channel output converted using the correlation equation for the saturated portion of the high gain channel output.

8 Claims, 10 Drawing Sheets

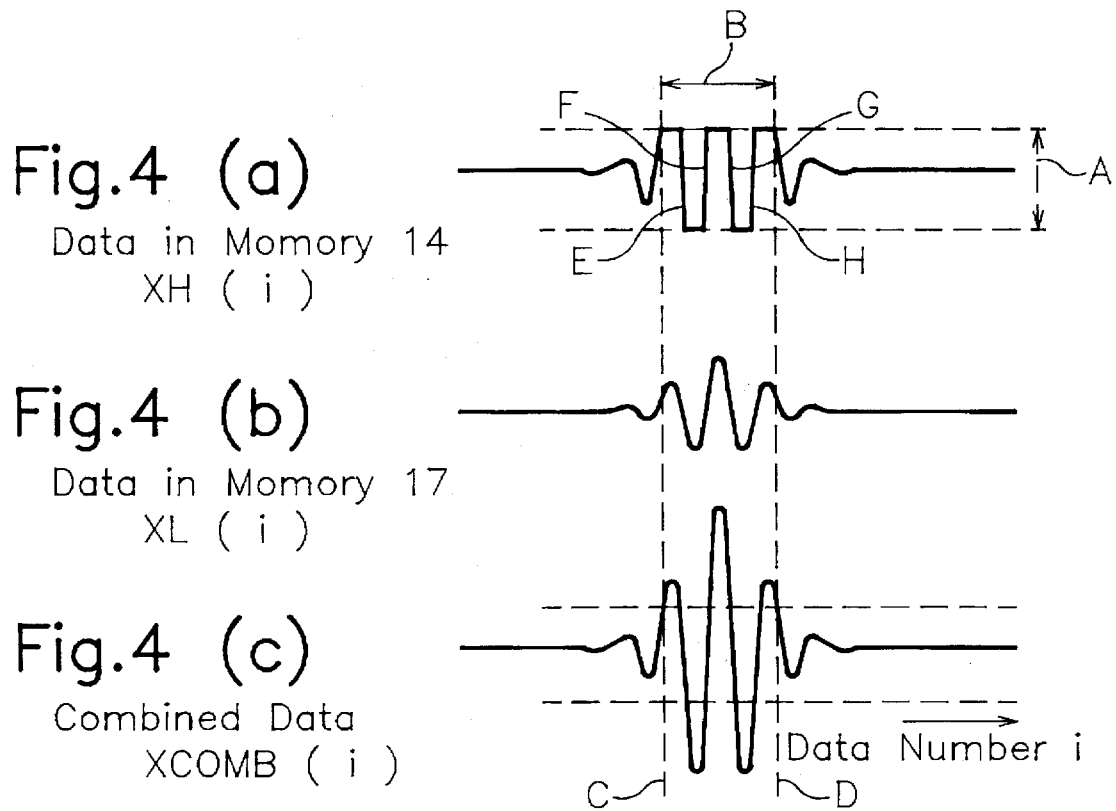
Fig.4 (a) Data in Momory 14 XH ( i )
Fig.4 (b) Data in Momory 17 XL ( i )
Fig.4 (c) Combined Data XCOMB ( i )
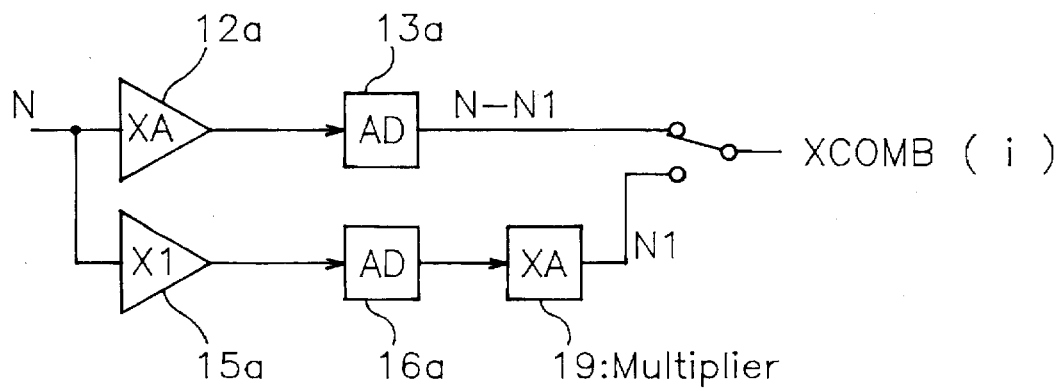
Fig.5

Fig.14 (a) Initial Gain Set A=Ao

Fig.14 (b) SN Calculation

Fig.14 (c) Set Gain A=A+a

Fig.14 (d) SN Calculation

Fig.14 (e) S/N>S/Nold ?  YES

NO

Fig.14 (f) Set Gain A=A−a

End

FOURIER TRANSFORM SPECTROMETER HAVING HIGH AND LOW GAIN CHANNELS

BACKGROUND OF THE INVENTION

1. Field of Invention

This invention relates to a Fourier transform spectrometer, and more particularly to such a spectrometer which has reduced A/D (analog-to-digital) converter noise.

2. Description of the Prior Art

Fourier transform spectrometers measure the interference light of a measured light by scanning an interferometer and determine the spectra of the measured light by implementing a Fourier transform on the measured result using computation control means, such as a computer.

FIG. 1 shows an example of a Fourier transform spectrometer comprising a light source 1 that emits a light to be measured, an interferometer 2, and a signal processor 50 comprising an optical detector 3, and A/D converter and computation control means 5, such as a central processing unit (also called a CPU).

The output light from light source 1 (i.e the light to be measured) changes to interference light in interferometer 2 and is detected by optical detector 3 and is converted to digital signals using A/D converter 4 which then outputs an interferogram. Finally, a spectrum is obtained through Fourier computation processing of the interferogram using CPU 5.

FIG. 2 shows a characteristic curve diagram of an interferogram obtained in the foregoing manner. The interferogram has a steep peak called a center burst, such as "A" at the center, and in other parts signal levels of approximately zero.

However, since the full span of the A/D converter 4 is not to saturate the above described burst, the quantified voltages contain high level noise of the A/D converter 4. However, the known Fourier transform spectrometers are plagued with a troublesome problem, namely, that since the full span of the A/D converter is set not to saturate the burst, a high S/N Fourier transform spectrometer cannot be realized because quantized voltages can only increase and measurement will always contain the high level noise of the A/D converter.

SUMMARY OF THE INVENTION

Accordingly, an object of the invention is to overcome the aforementioned and other disadvantages and deficiencies of the prior art.

Another object is to provide a high S/N Fourier transform spectrometer by reducing A/D converter noise.

BRIEF DESCRIPTION OF THE DRAWINGS

FIGS. 4(a)–4(c) are timing diagrams depicting production of a high S/N interferogram.

FIG. 5 is a block diagram depicting calculation of noise in an A/D converter.

FIGS. 14(a)–14(f) are flow chart steps depicting an example of a gain optimization procedure.

DETAILED DESCRIPTION OF THE PREFERRED EMBODIMENTS

Figure 1:
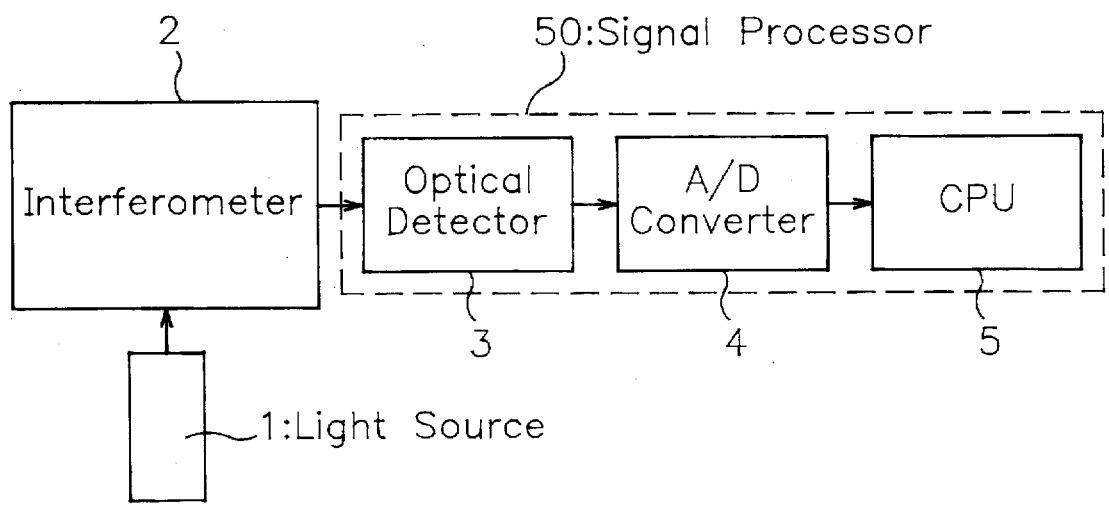
FIG. 1 is a block diagram depicting an example of a known Fourier transform spectrometer.
Figure 2:
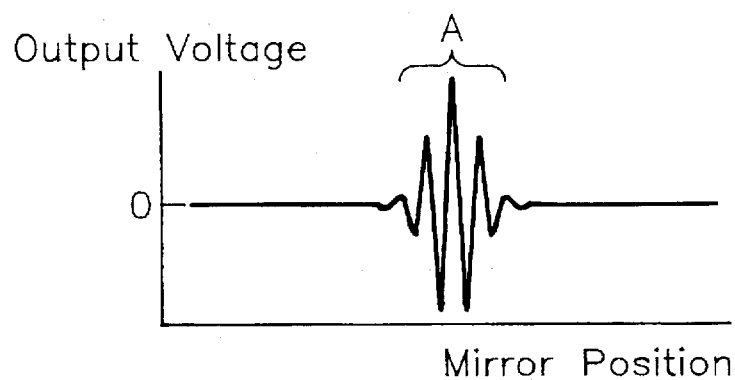
FIG. 2 is a characteristic curve diagram depicting an exemplary interferogram.
Figure 3:
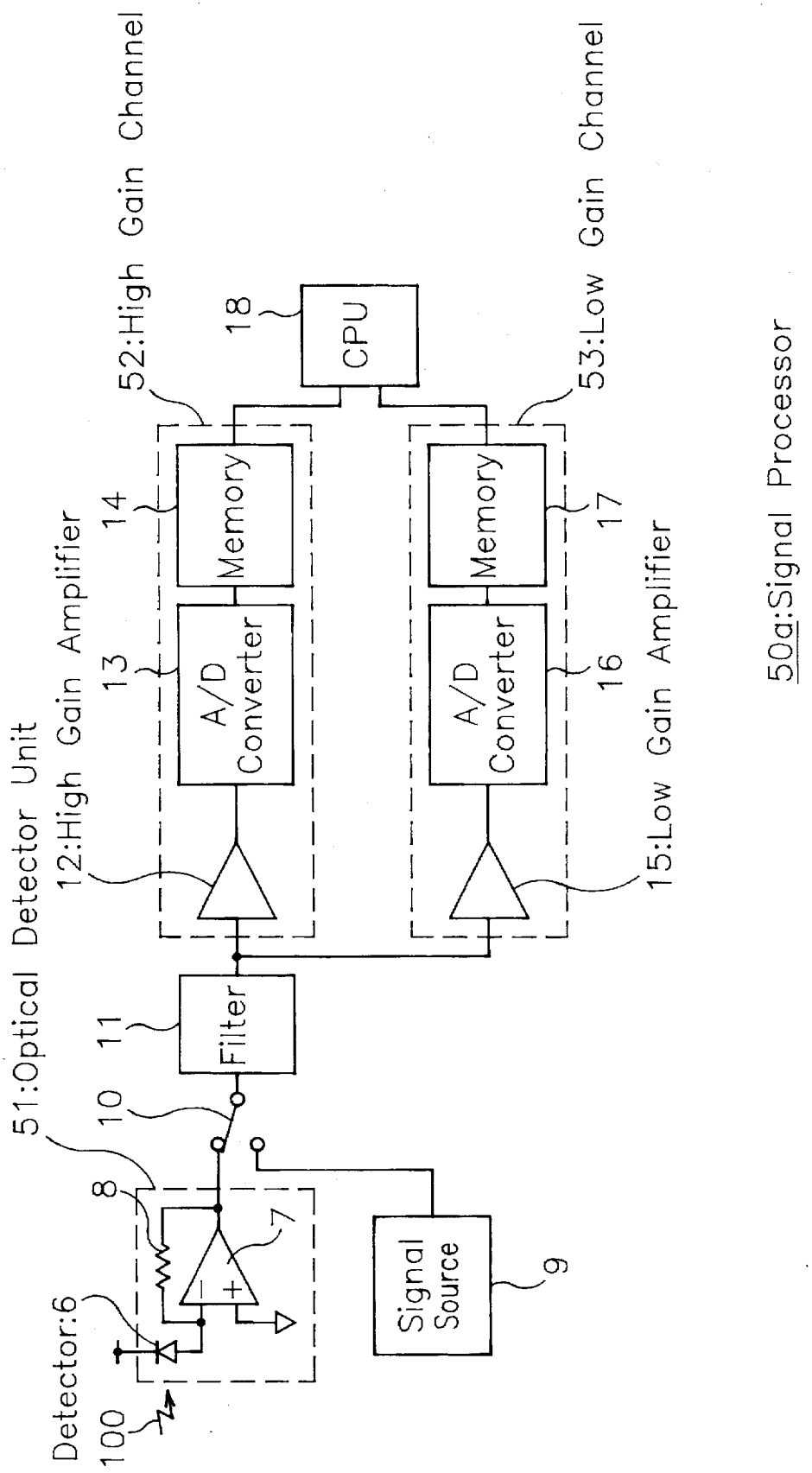
FIG. 3 is a block diagram depicting a first illustrative embodiment of the invention.

Turning to FIG. 3, since the configuration of the optical system of the invention is similar to those in existing spectrometers, description thereof is omitted for sake of clarity and only the signal processing means 50a is described. The embodiment comprises an optical detector circuit 51 comprising a light detector 6, such as a photodiode, an operational amplifier 7, and a resistor 8; a reference signal source 9 to generate a sine wave, a rectangular wave and/or a triangular wave; a switch circuit 10; a filter 11 which attenuates signals of higher frequencies, ½ or more of the sampling frequency; a high gain channel circuit 52 comprising a high gain amplifier 12 for which the gain is set so that the center burst portion is saturated, A/D convert 13 and data memory 14; a low gain channel circuit 53 comprising a low gain amplifier 15, for which the gain is set so that the center burst portion is not saturated, A/D converter 16, and data memory 17; and a central processing unit (CPU) 18. Interference light 100 is obtained from an interferometer not shown in the drawing.

Interference light 100 is made incident to detector 6, whose anode is connected to an inverted input terminal of amplifier 7 and to one terminal of resistor 8. The cathode of detector 6 is connected to a positive pole of a power supply. The non-inverted input terminal of amplifier 7 is grounded and the output terminal of amplifier 7 is connected to the other terminal of resistor 8 and to one input terminal of switch circuit 10. In addition, the output terminal of reference signal source 9 is connected to the other input terminal of switch circuit 10.

The output terminal of switch circuit 10 is connected, via filter 11, to high gain amplifier 12 and to low gain amplifier 15. The output terminals of amplifiers 12 and 15 are connected to A/D converters 13 and 15, respectively. The output terminals of A/D converts 13 and 16 are connected to data memories 14 and 17, respectively. The output terminals of data memories 14 and 17 are both connected to CPU 18.

The operation of the FIG. 3 embodiment will now be explained with reference to FIGS. 4(a)–4(c) which show timing diagrams for the production of a high S/N interferogram.

Reference signal source 9 is selected with switch circuit 10 and is applied concurrently, via filter 11, to the high gain and low gain amplifiers 12 and 15, respectively. The outputs from amplifiers 12 and 15 are converted to digital signals by A/D converters 13 and 16, respectively, and then stored in data memories 14 and 17, respectively.

CPU 18 is used to change reference signal source 9, fetch data, and calculate the correlation equation between high gain channel 52 and low gain channel 53.

Assuming that data "i" stored in data memory 14 is "XH(i)" and data "i" stored in data memory 17 is "XL(i)", then CPU 18 calculates the coefficients "A" and "B" so that the following equation holds:

$$XH(i)=A*XL(i)+B \tag{1}$$

This process may be done at the time of initialization or may be implemented at any time as desired.

Next, Optical detector unit 51 is selected with switch circuit 10, and the output signal from optical detector unit 51 is applied, via filter 11, to high gain amplifier 12 and low gain amplifier 15, then converted to digital signals in A/D converters 13 and 16, respectively, and then stored in data memories 14 and 17, respectively.

Since the gain of high gain amplifier 12 is set so that it saturates in the center burst portion, a waveform, such as shown in FIG. 4(a), is stored in data memory 14. For such a waveform, the part of the waveform exceeding "A" equivalent to the full span of A/D converter 13, such as shown in FIG. 4(a), saturates, and causes the saturated portion "B" shown in FIG. 4(a). Meanwhile since the gain of low gain amplifier 15 is set so that no saturation occurs in the center burst portion, the waveform shown in FIG. 4(b) is stored in data memory 17. In other words, the saturated portion shown by "B" in FIG. 4(a) is acquired completely by data memory 17.

CPU 18 examines the data stored in data memory 14, detects the starting and ending points, "C" and "D" (see FIG. 4(a)) of the saturated portion "B", and synthesizes a waveform using the data stored in data memory 14 for the portions other than the saturated portion "B" and using the data stored in data memory 17 after converting the data with the correlation equation (1) for the saturated portion "B".

In mathematical terms, let the synthesized data as described above be "X COMB(i)" and the points "C" and "D" in FIG. 4(c) be "ia" and "ib", and the number of data be "0 to N", then the following equations hold:

$$X\ COMB(i)=XH(i),\ where\ i=0\ to\ ia \tag{2}$$

$$X\ COMB(i)=A*XL(i)+B,\ where\ i=ia\ to\ ib \tag{3}$$

$$X\ COMB(i)=XH(i),\ where\ i=ib\ to\ N \tag{4}$$

As a result, an interferogram becomes a waveform which does not saturate in the center burst portion by detecting minute signals near zero, with A/D converter 13, detecting the center burst portion in an unsaturated status using A/D converter 15, and synthesizing both signal portions.

That is to say, the apparent input range is widened and the noise in the A/D converters 13 and 16 is reduced. This enables the invention to provide a high S/N Fourier transform spectrometer.

The reduction of noise in the A/D converters 13 and 16 is further described with reference to FIG. 5 which shows an amplifier 12a of "gain A", A/D converters 13a and 16a, an amplifier 15a of "gain 1" and a multiplier 19 of "gain A". If it is assumed that noise in A/D converters 13a and 16a is "δ", the total number of data is "0 to N" and the number of data in the low gain channel 53 used for the above synthesis is "N1", noise level "Noise" in known spectrometeters is expressed as:

$$Noise=[(N)^{1/2}*\delta] \tag{5}$$

Since the full span of the A/D converter is "1", the following holds:

$$S/N=Full\ Span/Noise=1/[(N)^{1/2}*\delta] \tag{6}$$

On the other hand, the noise level in the invention "$Noise_a$" is expressed as follows:

$$Noise_a=[N1*A^2+(N-N1)]^{1/2}*\delta \tag{7}$$

In this case, considering that the full span of the A/D converter is multiplied by "A", the S/N ratio is expressed as follows:

$$S/N = Full\ Span/Noise_a \tag{8}$$
$$= A/[N1*A^2+(N-N1)]^{1/2}*\delta$$

Consequently, improvement in the S/N ratio in the invention can be obtained by dividing equation (8) by equation (6), or $$[A/[N1*A^2+(N-N1)]^{1/2}*\delta]/[1/[(N)^{1/2}*\delta]] = \tag{9}$$

$$A*(N)^{1/2}/[N+N1*(A^2-1)]^{1/2} =$$

$$A/[1+(N1/N)*(A^2-1)]^{1/2}$$

Figure 6:
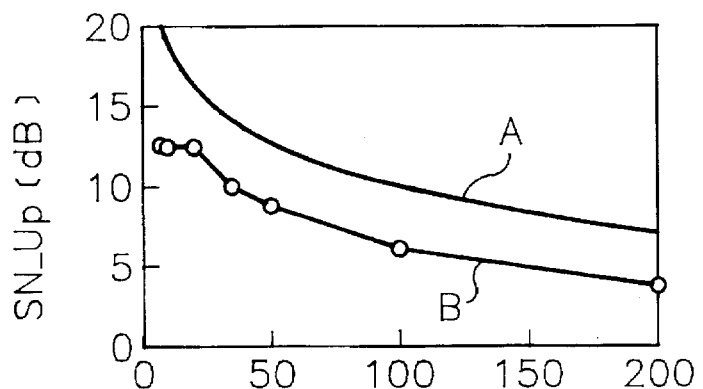
FIG. 6 is a characteristic diagram depicting calculated and actual characteristic curves.

FIG. 6 shows comparison of calculated S/N ratio "A" obtained through calculation using equation (9), and actual S/N values "B" for the embodiment of FIG. 3.

Figure 7:
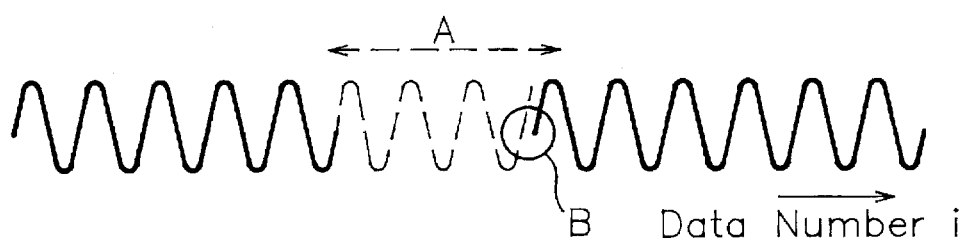
FIG. 7 is a characteristics diagram depicting data synthesis when a phase difference exists.

In addition, the correlation equation is determined from the gain characteristics between the two processing channels (i.e. 52 and 53) in the FIG. 3 embodiment. However, if the waveform phase between the two channels is different, a problem may occur. FIG. 7 shows the data synthesis when a phase difference exists and FIG. 8 shows an example of the spectrum.

Figure 8:
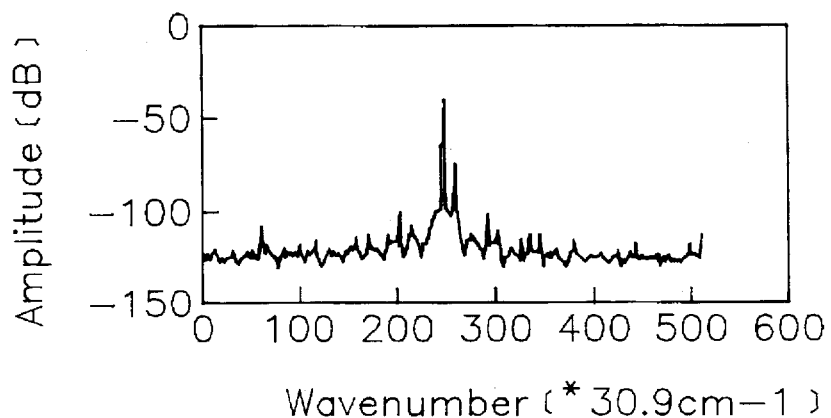
FIG. 8 is a diagram depicting an example of a spectrum.

When data in the low gain channel 53 is substituted for the portion "A" in FIG. 7, which is the data from the high gain channel 52, if a phase difference exists, as indicated by "B" in FIG. 7, the spectrum determined by Fourier transform processing of the above data is as shown in FIG. 8. As is apparent from FIG. 8, a side lobe is produced around the center peak signal of wave number 250. The input signal causes an error in the spectrum intensity due to the influence of the phase difference at the substituted part.

Figure 9:
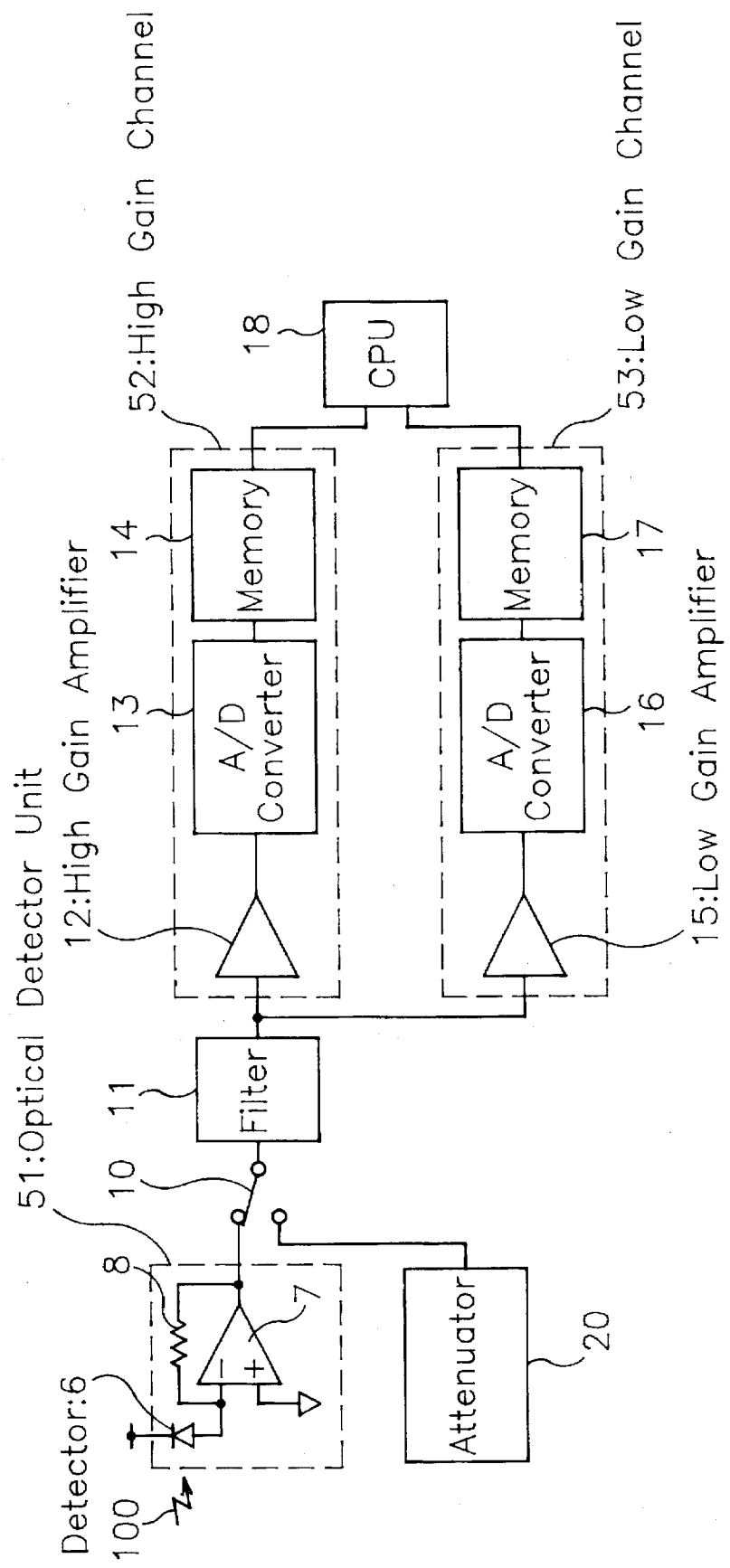
FIG. 9 is a block diagram depicting a second illustrative embodiment of the invention.

FIG. 9 shows the second illustrative embodiment which is different from the first embodiment of FIG.3 in that an attenuator 20 is shown in place of signal source 9. The operation of the second embodiment is explained with reference to FIGS. 10(a)–10(d) which show waveform diagrams of data synthesis.

First, attenuator 20 is selected with switch circuit 10 to apply an attenuator output signal to high gain amplifier 12 and low gain amplifier 15, respectively, via filter 11. After being converted into digital signals with A/D converters 13 and 16 respectively, the signals are stored in data memories 14 and 17, respectively.

CPU 18 determines the transfer function by implementing Fourier transform processing on the data stored in data memories 14 and 17. That is, similar to the discussion of FIG. 3, let the data "i" stored in data memory 14 be "XH(i)", the data "i" stored in data memory 17 be "XL(i)", and the results of Fourier transform processing on the data be "YH(k)", and "YL(k)", respectively. Then, the transfer function "Z(k)" is expressed as follows:

$$Z(k)=YH(k)/YL(k) \tag{10}$$

Second, CPU 18 determines a digital filter ZF(i) to realize the transfer function of equation (10). This process may be performed at the time of initialization or may be implemented at any time, as desired.

Third, CPU 18 selects optical detector unit 51 with switch circuit 10, inputs the output signal from optical detecting unit 51 to high gain amplifier 12 and low gain amplifier 15, via filter 11, and stores the output signals from amplifiers 12 and 15 in data memories 14 and 17, respectively, after converting them into digital signals using A/D converters 13 and 16 respectively.

Figure 10:
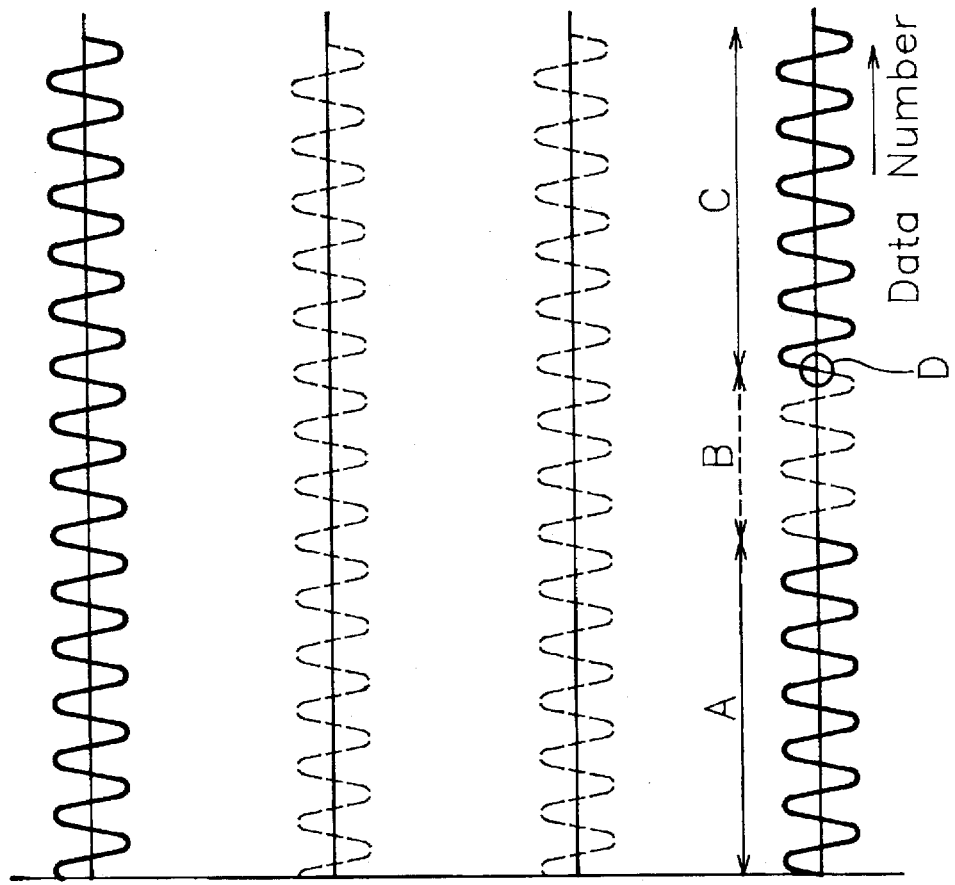
FIGS. 10(a)–10(d) are signal waveform diagrams depicting data synthesis.

In this case, a waveform, such as shown in FIG. 10(a) is stored in data memory 14 and a waveform, such as shown in FIG. 10(b) is stored in data memory 17. However, a phase difference may exist between the two waveforms, such as shown in FIGS. 10(a) and 10(b).

Fourth, CPU 18 applies the above determined digital filter ZF(j) to the waveform shown in FIG. 10(b) to obtain the data shown in FIG. 10(c). This process eliminates the phase difference between the two waveforms shown in FIG. 10(a) and 10(b).

CPU 18 then substitutes the data, similar to the manner discussed in FIG. 3. That is, in FIG. 10(d), data in FIG. 10(a) are used for portions "A" and "C" and data in FIG. 10(c) are used for portion "B".

As a result, processing of the phase of data for a low gain channel 53 with the digital filter eliminates the phase difference between both channels 52 and 53 at the substituted portion "B" and does not cause a side lobe. Thus, no error occurs in the spectrum intensity.

Figure 11:
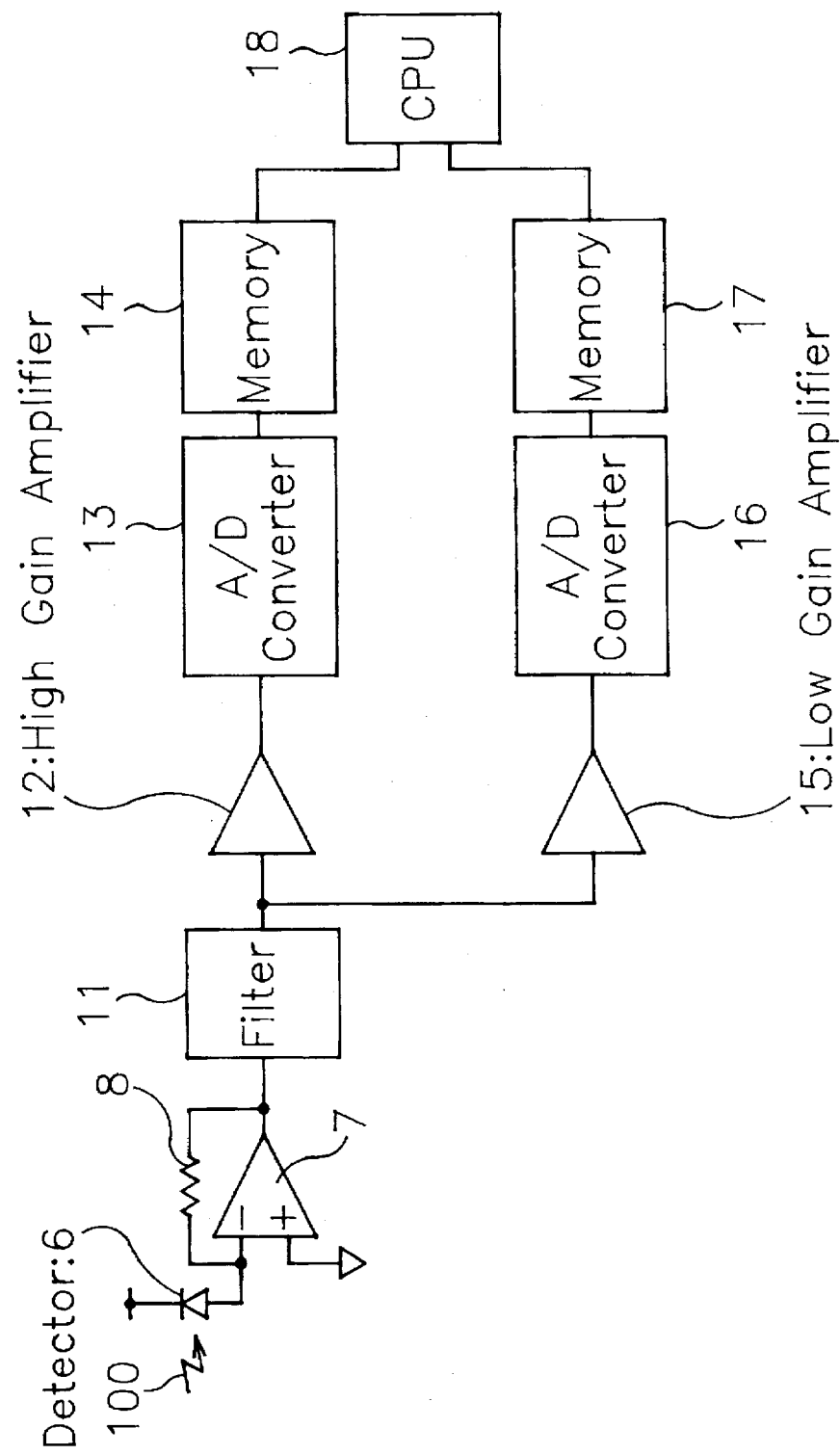
FIG. 11 is a block diagram depicting a third illustrative embodiment of the invention.

FIG. 11 shows a third illustrative embodiment, and differs from the first embodiment of FIG. 3 in that no signal source 9 is shown and differs from the second embodiment of FIG. 9 in that no attenuator 20 is shown, also in that no switch 10 is shown. The operation of the third embodiment of FIG. 11 is similar to that of the first embodiment of FIG. 3 except that the method for determining the correlation equation is different. In the FIG. 11 embodiment, a measured signal is fed directly to the high gain amplifier 12 and low gain amplifier 15, via filter 11, and their output signals are stored in data memories 14 and 17, respectively, after being converted into digital signals by A/D converters 13 and 16, respectively.

CPU 18 calculates the correlation equation between high gain amplifier 12 and low gain amplifier 15 in the manner as described for the FIG. 3 embodiment, based on unsaturated data within the data stored in data memories 14 and 17. As a result, the electric circuitry can be simplified because standard signal source 9 of FIG. 3 and switch circuit 10 are unnecessary.

Figure 12:
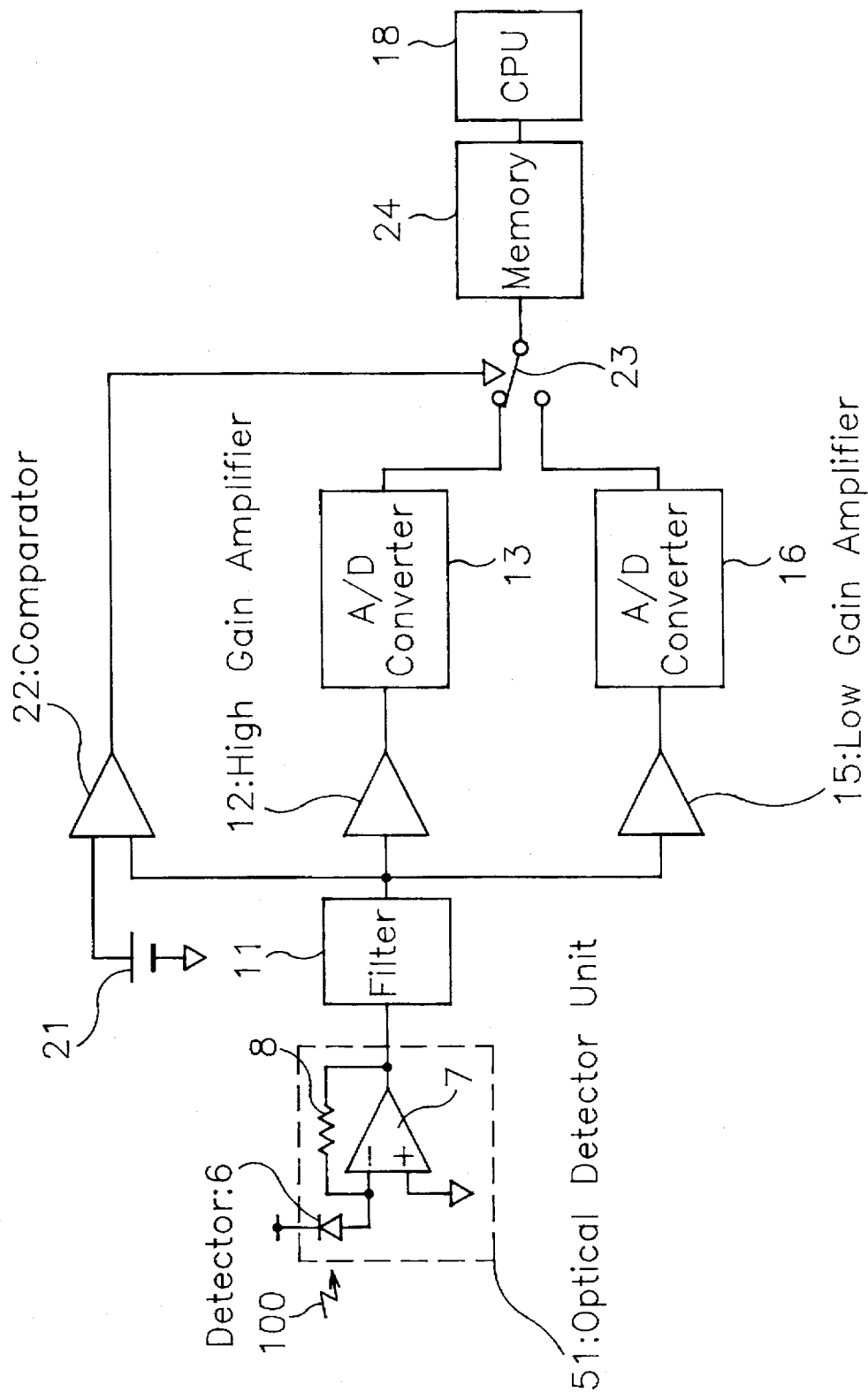
FIG. 12 is a block diagram depicting a fourth illustrative embodiment of the invention.

FIG. 12 shows a fourth illustrative embodiment of the invention which differs from the embodiment of FIG. 11 in the following respects. In FIG. 12 a comparator 22, a reference voltage 21, and switch circuit 23 are added, and only one memory 24 is used in place of the two memories 12 and 17 in FIG. 11. The output terminal of optical detector unit 51 is connected, via filter 11, to high gain amplifier 12 and low gain amplifier 15, and also to one input terminal of comparator 22, respectively. One terminal of reference voltage source 21 is connected to the other input terminal of comparator 22, while the other terminal of voltage source 21 is grounded.

The output terminals of high gain amplifier 12 and low gain amplifier 15 are connected to A/D converters 13, and 16, respectively, and the output terminals of A/D converters 13 and 16 are connected to two input terminals of a switch circuit 23, respectively. The output terminal of switch circuit 23 is connected to data memory 24 and the output terminal of data memory 24 is connected to CPU 18.

In the FIG. 12 embodiment, the number of data memories is reduced to one from two by selecting either the output terminal of A/D converter 13 or the output terminal of A/D converter 16, through the control of switch circuit 23 with the output signal from comparator 22. In addition, processing at a higher speed becomes possible because data transfer is cut in half.

Figure 13:
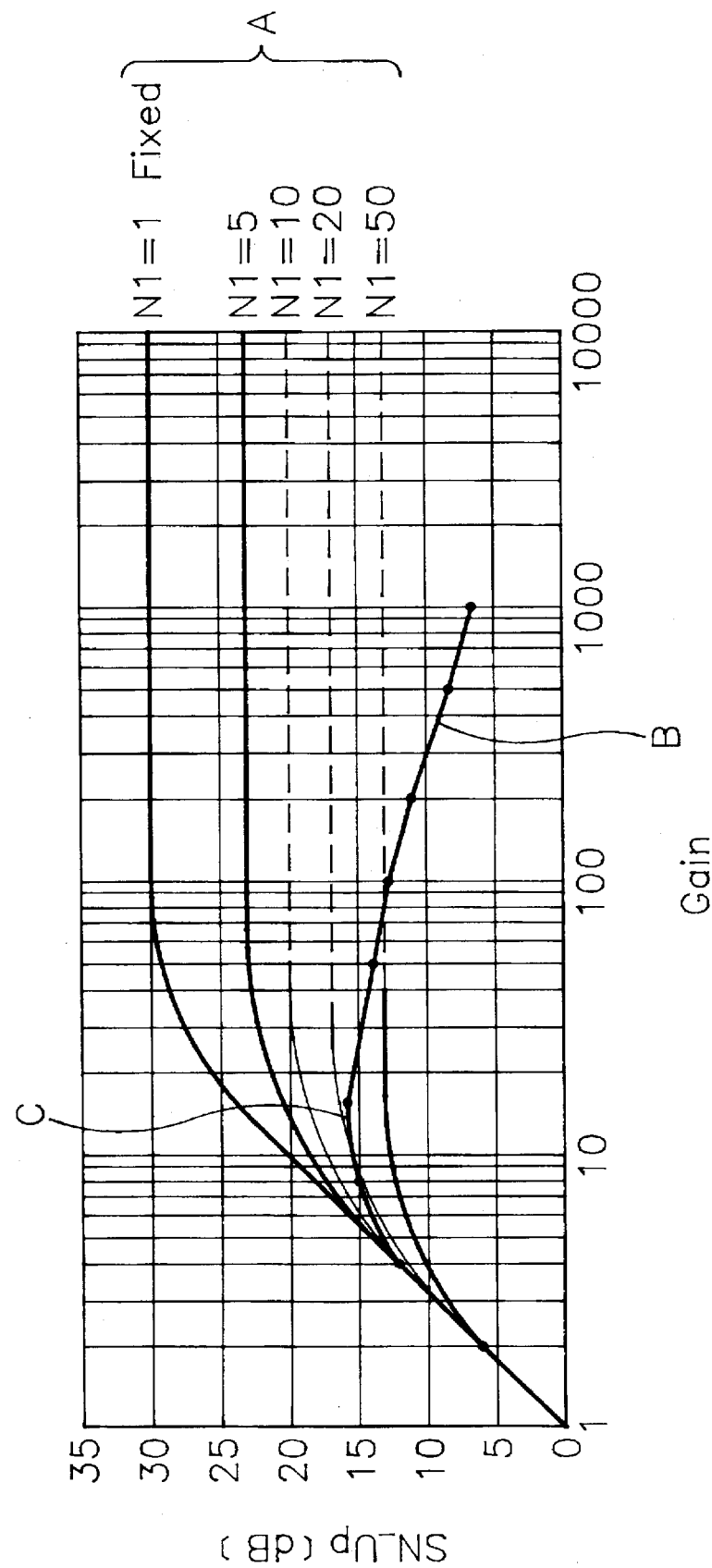
FIG. 13 is a characteristics diagram depicting improvement of the S/N ratio using gain as a parameter.

FIG. 13 shows the improvement of S/N using gain as a parameter for equation (9). Curves "A" indicate the improvement in the S/N ratio when the number of data "N1" in the low gain channel 53 used for the for the previously described synthesis, is fixed to be 1, 5, 10, 20 or 50. In this case, the S/N ratio improves as the gain increases, but after the gain reaches a certain value, the improvement becomes saturated.

However, since threshold levels vary as the gain actually changes, the improvement in the S/N ratio presents a curve "B", shown in FIG. 13. Accordingly, the maximum point appears on the curve "C" in FIG. 13. Thus, optimization is obtained by setting the gain to this maximum value.

For example, optimization can be performed by the following procedure. FIGS. 14(a)–14(f) shows steps in a flow chart of the optimization procedure.

In FIG. 14(a), the initial gain "A0" is set.
In FIG. 14(b), S/N ratio is calculated.
In FIG. 14(c), the gain is increased by "a".
In FIG. 14(d), the S/N ratio is calculated.
In FIG. 14(e), a new S/N ratio is compared with "S/N$_{old}$", which was calculated in the previous step. If the new ratio is larger than "S/N$_{old}$", the steps of FIGS. 14(c) and 14(d) are repeated. Also, when the new S/N ratio is smaller than "S/N$_{old}$", the gain is decreased by "a" as shown in FIG. 14(f), to return it to the maximum value.

As a result, the gain of high gain amplifier 12 can be optimized by maximizing the S/N ratio by changing the gain of the high gain amplifier 12. This process may be done at time of initialization or may be implemented at any time, as desired.

In addition, although the entire portion "B" of FIGS. 4(a)–4(c) is substituted using the output data from A/D convert 16, substitution is not limited to this procedure; rather, the data may be substituted by delimiting portion "B" into several parts. For example, since parts "E", "F" "G", and "H", shown in FIGS. 4(a)–4(c) are not actually saturated, if substitution is not carried out at these parts, the number of data "N1" in the previously described equation (9) is reduced. This improves the S/N ratio.

Also, the embodiments are described with the two channels 52 and 53 having different gains. However, the channels are not limited to two channels; rather, more than two channels can be used to improve the S/N ratio.

Moreover, the threshold value for data substitution may be automatically changed through the learning function using the actually measured data in advance.

The foregoing description is illustrative of the principles of the invention. Numerous extensions and modifications thereof would be apparent to the worker skilled in the art. All such extensions and modifications are to be considered to be with the spirit and scope of the invention.

What is claimed is:

1. A Fourier transform spectrometer comprising:
   optical detector means for receiving an interference light;
   low gain channel means and high gain channel means for converting and retaining an output from said optical detector means; and
   computation control means for determining an equation for correlation between said low gain channel means and said high gain channel means, and for substituting output from said low gain channel means as converted with said equation for correlation for a saturated portion of an output from said high gain channel means.

2. The spectrometer of claim 1, wherein said equation for correlation is determined at any time.

3. The spectrometer of claim 1, further comprising means for optimizing gain of said high gain channel means so that value of S/N is maximized.

4. The spectrometer of claim 2, further comprising means for optimizing gain of said high gain channel means so that value of S/N is maximized.

5. A Fourier transform spectrometer comprising:

optical detector means for receiving an interference light;

low gain channel means and high gain channel means for converting and retaining an output from said optical detector means; and computation control means for determining a transfer function between said high gain channel means and said low gain channel means, and for adjusting a phase of output from said low gain channel means based on said transfer function.

6. The spectrometer of claim 5, wherein said transfer function is determined at any time.

7. The spectrometer of claim 5, further comprising means for optimizing gain of said high gain channel means so that value of S/N is maximized.

8. The spectrometer of claim 6, further comprising means for optimizing gain of said high gain channel means so that value of S/N is maximized.

* * * * *